United States Patent
Leinung (10) Patent No.: US 8,515,618 B2
(45) Date of Patent: Aug. 20, 2013

(54) METHOD AND DEVICE FOR DETERMINING OVERRUN CONDITIONS OF A VEHICLE

(75) Inventor: Andreas Leinung, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 534 days.

(21) Appl. No.: 12/687,452

(22) Filed: Jan. 14, 2010

(65) Prior Publication Data

US 2010/0174451 A1     Jul. 8, 2010

Related U.S. Application Data

(63) Continuation of application No. PCT/EP2008/005476, filed on Jul. 4, 2008.

(30) Foreign Application Priority Data

Jul. 16, 2007   (DE) .......................... 10 2007 032 968

(51) Int. Cl.
   *G06F 7/00*   (2006.01)
(52) U.S. Cl.
   USPC .......................................................... 701/36
(58) Field of Classification Search
   USPC .......................................................... 701/36
   See application file for complete search history.

(56) References Cited

U.S. PATENT DOCUMENTS

| | | | |
|---|---|---|---|
| 6,292,726 B1 * | 9/2001 | Gustavsson | 701/36 |
| 2004/0030471 A1 | 2/2004 | Faye | |
| 2004/0242144 A1 | 12/2004 | Burn et al. | |
| 2005/0178622 A1 | 8/2005 | Blue | |
| 2005/0251332 A1 * | 11/2005 | Entenmann et al. | 701/208 |
| 2005/0278118 A1 | 12/2005 | Kim | |
| 2006/0030992 A1 | 2/2006 | Iwatsuki et al. | |

FOREIGN PATENT DOCUMENTS

| | | |
|---|---|---|
| DE | 197 37 051 A1 | 3/1999 |
| DE | 101 28 758 A1 | 12/2002 |
| DE | 10 2005 045 891 B3 | 2/2007 |
| EP | 1 637 385 A2 | 3/2006 |
| JP | 11-13507 A | 1/1999 |
| WO | WO 2006/071170 A1 | 7/2006 |

OTHER PUBLICATIONS

German Office Action dated Feb. 28, 2008 w/English translation (ten (10) pages).
International Search Report dated Dec. 11, 2008 w/English translation (six (6) pages).

* cited by examiner

*Primary Examiner* — Khoi Tran
*Assistant Examiner* — Nicholas Kiswanto
(74) *Attorney, Agent, or Firm* — Crowell & Moring LLP (57) ABSTRACT

A method and a device are provided for determining an overrun condition of a vehicle, in particular a commercial vehicle, including a control unit that determines the overrun condition. The control unit is suitable for determining a probable occurrence of at least one overrun condition, at least in accordance with altitude or height profile data of a route that is and/or will be traveled by the vehicle. A navigation system, that is suitable for determining at least height profile data of a route that is traveled or will be traveled by a vehicle, is used in order to allow the determination of a probable occurrence of at least one overrun condition of the vehicle in accordance with the height profile data. Synchronization of an air supply operation during the overrun condition is hence possible.

6 Claims, 3 Drawing Sheets

Fig. 1

METHOD AND DEVICE FOR DETERMINING OVERRUN CONDITIONS OF A VEHICLE

CROSS-REFERENCE TO RELATED APPLICATIONS

This application is a continuation of PCT International Application No. PCT/EP2008/005476, filed Jul. 4, 2008, which claims priority under 35 U.S.C. §119 from German Patent Application No. DE 10 2007 032 968.9, filed Jul. 16, 2007, the entire disclosures of which are herein expressly incorporated by reference.

This application contains subject matter related to U.S. application Ser. No. 12/687,631, entitled "Apparatus and Method for Identifying in Advance Overrun Phases of a Vehicle," and to U.S. application Ser. No. 12/687,428, entitled "Control Device for a Compressed Air System of a Vehicle," now U.S. Pat. No. 7,908,055, issued Mar. 15, 2011, both filed on even date herewith.

BACKGROUND AND SUMMARY OF THE INVENTION

The invention relates to a device for determining overrun conditions of a vehicle, in particular of a commercial or utility vehicle, having a processing device which serves to determine the overrun conditions. Furthermore, the invention relates to a method for determining overrun conditions of a vehicle, in particular of a commercial or utility vehicle. Likewise, the invention relates to the use of a navigation system which is suitable for determining at least altitude (height) profile data of a section of road which is being traveled on or is to be traveled on by a vehicle.

Generally, the prior art discloses that in vehicles, in particular in commercial or utility vehicles, an instantaneous or present case of overrun conditions of the vehicle is determined. Given knowledge of the occurrence of the overrun conditions, various vehicle components can be controlled or actuated using, for example, a processing device or calculation device and control device, in order thereby to be operated in a way which is economical in terms of energy. One of these vehicle components can be, for example, an air supply system. For example, in utility vehicles such air supply systems, in particular electronic air supply systems, for supplying compressed air consumer circuits with compressed air are controlled by control devices. Such compressed air consumer circuits are, for example, brake circuits of a utility vehicle brake system, a secondary consumer circuit, a trailer supply circuit, a parking brake system circuit, an air suspension circuit, etc. The compressed air supply or the air supply is therefore a central component in the utility vehicle brake system. In particular for the utility vehicle brake system, the air supply system controls the taking up of braking energy in the form of compressed air. It is therefore an intermediate element or connecting element between a compressor, which is provided for providing or supplying compressed air, and which delivers oil-containing and water-containing air, and the compressed air consumer circuits in the utility vehicle.

Electronically controlled air supply systems are already known in the prior art. Such an air supply system controls the taking up of compressed air, its filtering and drying and the distribution of the compressed air purified in this way among the various compressed air consumer circuits by means of, for example, an electronic processing device or control device which is assigned to the air supply system. This is generally done in conjunction with specific compressors of differing designs and also using vehicle information from other control units or control devices which are provided in the utility vehicle. However, the air supply by means of the air supply system leads to a high consumption of energy or fuel. This is due to the fact that in order to provide the compressed air, the compressor has to be driven by way of an internal combustion engine of the utility vehicle via, for example, a positively locking connection. Measures for reducing the consumption of fuel were already taken in the prior art, with multiple and in some cases also different approaches being followed.

One approach is, for example, to switch over a compressor resistance to an idling operating mode in which only the driving power for the internal combustion engine, which is necessary for the idling mode, is incurred. This switching over is usually carried out in travel states of the utility vehicle in which, for example, the brake system is filled with compressed air and no further feeding of compressed air is necessary. The compressors which are suitable for switching over therefore have a pneumatic control line, referred to as the ESS line. These compressors are actuated by the air supply system via the control line, as a result of which the feeding of the compressed air counter to the compressed air levels present in the compressed air consumer circuits is interrupted. In this idling operating mode, for example, the compressor pumps the air in the circuit and/or exchanges it with the surroundings.

A further approach is to interrupt the positively locking connection between the internal combustion engine and the compressor completely during the idling operating mode if air supply is not necessary. This can be implemented, for example, by means of a compressor clutch or a clutch which is provided between the compressor and the internal combustion engine. In comparison to the approach mentioned above, in this case the idling load during the idling operating mode of the compressor is entirely taken away from the internal combustion engine.

Furthermore, in the prior art an approach is known for performing synchronization of an air supply operation or of a compressed air providing operation with overrun conditions or overrun phases of the internal combustion engine, i.e. to drive the compressor during the overrun conditions of the internal combustion engine. In this case, overrun conditions of the utility vehicle are understood to be the operating phases in which the engine is towed by the kinetic energy of the vehicle without fuel being consumed when the drive train is connected in a positively locking fashion, for example in an engine braking mode.

In particular, the overrun conditions of the utility vehicle are determined in the air supply systems belonging to the prior art by virtue of the fact that various information items which are made available, for example a negative torque when the gearspeed is engaged simultaneously and the clutch is closed or transmitting force, are used by way of a CAN bus which is usually used in the utility vehicle. In this context, if this state lasts for a specific duration of several seconds in such electronic air supply systems, it is inferred that there is a section of road with a negative gradient and therefore the overrun conditions are persisting over a relatively long time, i.e. an expected duration of the overrun conditions is assumed. The overrun conditions are thus used to carry out the provision of compressed air and therefore to bring about an increase in the compressed air level in, for example, the brake system without fuel being consumed (overrun mode).

However, when the compressor switches over from the provision of compressed air to the idling operating mode, a considerable volume of compressed air is lost, for example from lines, etc. In particular, this volume of compressed air is blown off into the surroundings (atmosphere) during the switching over. For this reason, the switching over should take place only if overrun conditions are expected to persist for a relatively long time. However, this is not taken into account in the execution of the air supply operation according to the prior art; all that is determined is the instantaneous occurrence of the overrun conditions. As a result, during the overrun conditions or overrun phases of the internal combustion engine, which are only very short under certain circumstances, switching over to the consumption-free feeding of air or provision of air occurs. In this context it is possible, in particular during the subsequent switching over to, for example, the idling operating mode of the compressor, to eject a quantity of compressed air which is equal to or even larger than the previously fed quantity of compressed air. As a result, instead of an originally intended saving in energy, energy is lost. The cause of this is that with the current way of determining the overrun conditions there is a lack of certainty about the continuation of the overrun conditions. In addition, frequent changing between the two operating modes of the feeding of compressed air and the idling mode has a disadvantageous effect on the achievable service life of corresponding switching components.

For the abovementioned reasons, it is therefore possible, under certain circumstances, for fuel consumption to increase. However, on the part of vehicle manufacturers there is increasingly a requirement by customers for the functionality to be improved in all components which consume energy and therefore fuel.

The object of the invention is therefore to develop devices and methods for determining overrun conditions of vehicles in such a way that more certainty about the continuation of overrun conditions is obtained.

The device according to the invention for determining overrun conditions of a vehicle is based on the prior art of the generic type by virtue of the fact that the processing device is suitable for determining an expected occurrence of at least one case of overrun conditions at least as a function of altitude (height) profile data of a section of road which is being traveled on and/or is to be traveled on by the vehicle. The altitude profile data of the section of road which is being traveled on and/or is to be traveled on by the vehicle are obtained here, for example, from a satellite-supported navigation system (for example one which uses GPS) provided in the utility vehicle. In this case, the navigation system not only supplies position information data and travel information data of the commercial or utility vehicle, which are provided, for example, for identifying a destination, but also altitude information data from which the altitude profile data of the section of road which is being traveled on and/or is to be traveled on by the vehicle can be determined. This can be brought about, in particular, by virtue of the fact that topographic map material is made available to the navigation system. By including the altitude profile data in the determination of the overrun conditions, in particular in the execution of synchronization of the air supply operation with the overrun conditions, it is possible to ensure that the vehicle is actually located in a section of road with a negative gradient. This ensures, for example, that the synchronization of the air supply operation with the overrun conditions is carried out in a way which is better tailored to demand.

In particular, the overrun conditions are utilized better for air supply. Likewise, the determination of the expected occurrence of overrun conditions can also be used for other vehicle components. For example, the operation or driving of a generator to generate current can also be made dependent on this determination in order, for example, to charge an electrical energy source. The overall fuel consumption can therefore be reduced. The device according to the invention is particularly suitable here for electronically controlled air supply systems which can carry out electronic air supply, for example EAC (electronic air control). The altitude profile data preferably include, inter alia, vertical position coordinates of a plurality of section-of-road points or section-of-road areas along the section of road which is being traveled on or is to be traveled on.

The device according to the invention can advantageously be developed such that the processing device is also suitable for determining the expected occurrence of the at least one case of overrun conditions as a function of current position data of the vehicle and/or current vehicle parameters. In particular, the use of current vehicle parameters and of the section-of-road profile data of the section of road which is being traveled on or is still to be traveled on by the vehicle increases the certainty of the determination of the overrun conditions and therefore, for example, the efficiency of the synchronization of the air supply operation with the overrun conditions. The position data which are processed by the processing device include, inter alia, the instantaneous position (x coordinate and y coordinate) of the traveling vehicle along the route.

Furthermore, the device according to the invention can be embodied in such a way that the processing device is suitable for determining the expected occurrence of the at least one case of overrun conditions for a part of a section of road which lies ahead of the vehicle and has a predefined length. The processing device therefore calculates a prediction, which includes the expected occurrence of future overrun condition phases along the respective parts of the route lying ahead of the vehicle.

Furthermore, the device according to the invention can be implemented such that the processing device is suitable for determining whether one or more cases of overrun conditions can be expected to occur in the predefined part of a section of road. This increases the certainty about the chronological continuation of overrun conditions or of an overrun phase since calculation in advance takes place.

In addition, the device according to the invention can be configured such that the processing device is suitable for inferring, on the basis of the altitude profile data, at least one negative-gradient part, at which the at least one overrun condition can be expected to occur, of the section of road which is being traveled on and/or is to be traveled on. In contrast to the prior art, in which a negative gradient on a section of road is inferred only by reference to current vehicle parameters, the device according to the invention ensures, on the basis of the altitude profile of the section of road which is being traveled on and/or is to be traveled on by the vehicle, that a negative gradient on a section of road is actually present. The processing device then preferably compares a length of a negative gradient on a section of road lying ahead with a predefined minimum length, wherein a selective utilization of overrun condition phases is considered only on such sections of road with a negative gradient whose length exceeds the predefined minimum length.

Furthermore, the device according to the invention can be developed such that the processing device is suitable for determining, on the basis of the altitude profile data, the current vehicle parameters, and/or the current position data, a duration of the overrun conditions which are expected to occur. The determination or the calculated prediction preferably includes information about an expected time of the start and a time of the expected ending of the overrun conditions.

Furthermore, the determination can also include the chronological duration of one or more overrun condition phases which are expected to occur or are imminent. Likewise, the processing device can determine a time interval to the earliest overrun condition phase which is expected to occur and whose duration is expected to exceed the predefined minimum duration. In particular, the definition of limiting values such as, for example, the predefined minimum duration, can be determined as a function of one or more instantaneous vehicle parameters. Likewise, constant limiting values which the processing device uses can also already be predetermined. These limiting values may be retrieved, for example, from a non-volatile or volatile memory, for example a ROM or RAM memory. The calculation of an expected duration of the overrun conditions is intended to ensure that no unnecessary switching over between an idling operating mode and an air supply operation of the compressor is performed. The synchronization is therefore performed only if an adequate duration of the overrun conditions can be expected. For example, a predetermined limiting duration can be defined for this assessment. The synchronization is ultimately carried out only if the duration is longer than the limiting duration. Therefore, the assessment of the expected duration of the overrun conditions brings about an overall increase in the energy-saving re-usability of the overrun conditions.

The device according to the invention can be advantageously developed such that, when an instantaneous overrun condition occurs, the processing device is suitable for determining a continuing duration of instantaneous overrun condition on the basis of the altitude profile data, the current vehicle parameters, and/or the current position data. The processing device can therefore in particular respectively generate signals for instantaneous overrun condition phases which indicate whether, in view of the expected remaining chronological duration of the corresponding overrun condition phase, a technical utilization of this overrun condition phase will bring about energy recovery and/or energy storage for at least one vehicle component. It is preferably possible to provide that the processing device respectively generates, for an instantaneous overrun condition phase which has already occurred, a signal which, if the expected remaining chronological duration of the instantaneous overrun condition phase exceeds a predefined limiting value, gives rise to a technical utilization of this overrun condition phase which brings about energy recovery and/or energy storage for at least one vehicle component. It is likewise possible to provide that the processing device prevents a technical utilization of an instantaneous or expected subsequent overrun condition phase for the recovery of energy and/or storage of energy for vehicle components if the chronological duration of the overrun condition phase is expected to be shorter than the minimum duration, and this overrun condition phase precedes an overrun condition phase whose duration is longer than the predefined minimum duration. This means that only that overrun condition phase which is expected to occur whose duration is predicted to be adequately long is used. The technical utilization can be performed, for example, in the form of generation, feeding, passing on, treating or storage of compressed air in at least one vehicle component.

Furthermore, the device according to the invention can be embodied such that the altitude profile data of the section of road which is to be traveled on by the vehicle are based on altitude profile data of a total route which are calculated in advance. The total route is predetermined by means of a starting position and a predetermined destination of the vehicle. As a result, information about the future profile of the section of road is suitably evaluated, as a result of which the entry time, the positive gradient and the duration of upcoming parts of a section of road with a negative gradient up to the destination are respectively known in advance over the total route. In particular, this permits efficient planning of the synchronization operations of the air supply operation with the overrun conditions which are expected to occur. The efficient planning takes into account here only those cases of overrun conditions whose duration also involves a savings in energy. As a result, for example, a length of the negative gradient can be calculated in advance up to a certain degree, permitting possible overrun conditions to be predicted. By taking into account the destination which is input by the driver, it is possible to plan the refueling processes or air supply operations over the course of the section of road which is already known or the total route. Consequently, the overrun conditions of the vehicle can be predicted, as a result of which the kinetic energy of the vehicle can be used for energy-saving ventilation of the brake system with air.

In this context it is particularly advantageous to use all the parameters for automatically calculating the overrun conditions in advance in order, for example, to obtain the start, the duration and the end of the overrun conditions using the positive gradient/negative gradient profile relating to the section of road. Furthermore, straight relatively long sections of road with a negative gradient can already be included in an optimum way in advance in the planning for energy-saving air supply, and then utilized. The air supply can, inter alia, include the re-filling of the air supply system with compressed air, the regeneration of, for example, an air drier of the air supply system, an air pressure controller in the brake system, etc.

Furthermore, the device according to the invention can be implemented such that the processing device is suitable for controlling an operating mode of at least one vehicle component as a function of the at least one overrun condition of the vehicle which is determined and which is expected to occur. This may include all the vehicle components whose operation using the overrun condition involves a saving in energy, in particular the above-mentioned generator or the air supply system.

In this context, the at least one vehicle component may preferably be at least a brake system, a component of a brake system, a dynamo, the generator, the air supply system, a compressor, a retarder, an air suspension control module (ELC), a tachometer (TC), an instrument (INS) and/or an engine controller (FR). In the case of the air supply system which is operated as a function of the overrun conditions, in particular a clutch, a compressor, a compressed air valve, a compressed air distributor, an air treatment unit or an air purification cartridge may be components which are to be actuated or controlled.

Furthermore, the device according to the invention can also be implemented such that the processing device is suitable for controlling the air supply system such that, when the overrun condition which is determined and which is expected to occur occurs, the air supply system synchronously carries out an air supply operation. In particular, with respect to the air supply it is possible for the determination of the expected occurrence of future cases of overrun conditions and the utilization thereof to be particularly efficient, as mentioned above, since the air supply system plays a central role in vehicles, in particular commercial or utility vehicles, which use compressed air. References to commercial or utility vehicles are used interchangeably herein.

In this context, the processing device can control, for example, the air pressure of a pneumatic control line which leads from a compressed air distributor to a compressor. Furthermore, the processing device can, however, also carry out the control by means of electrical signals. For example, a compressor or a compressed air distributor, a compressed air treatment unit, a compressed air consumer or further components may be actuated pneumatically by the air supply system.

In this context it is possible to provide that the device according to the invention is implemented such that the processing device is suitable for controlling the air supply system such that the execution of the synchronization of the air supply operation with the overrun conditions is based at least on the presence of the at least one negative-gradient part of a section of road.

Furthermore, the device according to the invention can be embodied in such a way that the processing device is suitable for assessing whether the air supply operation is being carried out, on the basis of inter-vehicle distance data relating to the distance between the vehicle and another vehicle traveling ahead. It is therefore possible to distinguish in particular between random and brief cases of overrun conditions due to an impending rear-end collision with a vehicle in front by reference to the inter-vehicle distance data and cases of overrun conditions which relate to the section of road and are relatively long term and therefore can be used efficiently.

Furthermore, the device according to the invention can be implemented in such a way that the processing device is suitable for controlling the air supply system such that the air supply operation is carried out by operating a compressor which is coupled to a drive train, wherein the processing device is also suitable for controlling the air supply system so that the air supply operation is ended if the compressor is operated in an idling mode and/or is decoupled from the drive train. The compressor, which is coupled to the drive train, supplies the air supply system or the air supply unit with compressed air. On the other hand, if the demand for compressed air is no longer present, the compressor is switched, for example, into an idling state in which the air supply system or the air supply unit is no longer supplied with compressed air (or only with compressed air at a relatively low pressure). In particular, the processing device can actuate a compressed air valve. Likewise, a compressed air distributor can be actuated by the processing device. The processing device therefore actuates, for example, the compressed air treatment unit in such a way that a compressed air cartridge of the compressed air treatment unit is not regenerated during the occurrence of overrun conditions. In contrast, the compressed air cartridge is preferably regenerated when no overrun conditions are occurring. In particular, the processing device uses the determination of the cases of overrun conditions which are expected to occur to control the air treatment system in such a way that times at which regeneration of the compressed air cartridge, in particular dehumidification and cleaning are carried out, are brought forward or delayed as a function of the determination of the cases of overrun conditions which are expected to occur. For example, the time of regeneration is put back at most to times during relatively short overrun condition phases.

Furthermore, the device according to the invention can be embodied such that the processing device is suitable for controlling the air supply system in such a way that, when overrun conditions of the vehicle are not occurring, the air supply operation is also carried out when the air supply of the vehicle is absolutely necessary. This measure serves to reliably supply the air supply system with compressed air, which has to be ensured in all cases even if no air supply operation can be synchronized with the overrun conditions.

In addition, the current vehicle parameters which the device according to the invention uses include at least one element from the position data or altitude data of the vehicle, the vehicle speed, wheel speeds and/or yaw rates, a vehicle acceleration, a compressed air level of a brake system, a humidity level of a compressed air vessel or of a compressed air treatment cartridge, an engine speed, the absolute value and/or the sign of an engine torque, clutch data and/or gearspeed data, retarder data of the vehicle and a distance from another vehicle traveling ahead. Since the information or data supplied by the navigation system is used in conjunction with current, vehicle-specific variables such as wheel speeds and yaw rates, etc., the position of the vehicle can be calculated with precision up to a few meters. The current parameters are preferably also made available to further processing devices and/or control units or control devices which are not involved in controlling the air supply. This is done, for example, by way of a CAN bus which is provided in the vehicle. Furthermore, inter-vehicle distance information data relating to vehicles traveling ahead, made available by driver assistance systems (Adaptive Cruise Control=ACC), can be used to assess whether the synchronization should take place.

Furthermore, the device according to the invention can be embodied such that the processing device is suitable for obtaining at least the altitude profile data and/or the current position data from a navigation system. The data which are supplied by the navigation system can be passed on in this way to the processing device. In this context, the navigation system can also supply instantaneous vertical positions of the vehicle. A navigation system which is supported by a GPS (Global Positioning System) or a satellite-supported navigation system is preferably used. The navigation system correspondingly supplies altitude profile data which contain, inter alia, vertical position coordinates of a plurality of section-of-road points or of section-of-road areas along the route which is being traveled on or is to be traveled on.

The method according to the invention for determining overrun conditions of a vehicle is based on an expected occurrence of at least one overrun condition being determined at least as a function of altitude profile data of a section of road which is being traveled on and/or is to be traveled on by the vehicle.

As a result, the properties and advantages explained in conjunction with the device according to the invention are obtained in the same way or in a similar way, for which reason reference is made to the corresponding statements relating to the device according to the invention, in order to avoid repetition. The same applies correspondingly to the following preferred embodiments of the method according to the invention, with reference also being made in this regard to the corresponding statements relating to the device according to the invention in order to avoid repetition.

The method according to the invention can advantageously be developed such that the expected occurrence of the at least one overrun condition is also determined as a function of current position data of the vehicle and/or current vehicle parameters.

Furthermore, the method according to the invention can be carried out such that the expected occurrence of the at least one overrun condition is determined for a part of a section of road which lies ahead of the vehicle and has a predefined length.

Furthermore, the method according to the invention can be implemented such that it is determined whether one or more overrun conditions can be expected to occur in the predefined part of the section of road.

In addition, the method according to the invention can be implemented such that at least one negative-gradient part, at which the at least one overrun condition can be expected to occur, of the section of road which is being traveled on and/or is to be traveled on is inferred on the basis of the altitude profile data.

Furthermore, the method according to the invention is preferably implemented such that a duration of the overrun conditions which are expected to occur is determined on the basis of the altitude profile data and/or the current vehicle parameters and/or the current position data.

The method according to the invention can advantageously also be developed such that, when an instantaneous overrun condition occurs, a continuing duration of the instantaneous overrun condition is determined on the basis of the altitude profile data and/or the current vehicle parameters and/or the current position data.

Furthermore, the method according to the invention can be developed such that the altitude profile data of the section of road which is to be traveled on by the vehicle are based on altitude profile data of a total route which are calculated in advance, which total route is predetermined by way of a starting position and a predetermined destination of the vehicle.

In addition, the method according to the invention is implemented in such a way that an operating mode of at least one vehicle component is controlled as a function of the at least one overrun condition of the vehicle which is determined and which is expected to occur.

Furthermore, the method according to the invention can be implemented in such a way that the at least one vehicle component is at least a brake system, a component of a brake system, a dynamo, a generator, an air supply system, a compressor, a retarder, an air suspension control module, a tachometer, an instrument and/or an engine controller.

In this context, it is particularly advantageous to configure the method according to the invention in such a way that the air supply system is controlled in such a way that when the overrun condition which is determined and which is expected to occur occurs, the air supply system carries out an air supply operation synchronously.

The method according to the invention is preferably developed in such a way that the air supply system is controlled so that the execution of the synchronization of the air supply operation with the overrun conditions is based at least on the presence of the at least one negative-gradient part of a section of road.

In this context, it is particularly advantageous to develop the method according to the invention in such a way that on the basis of inter-vehicle distance data relating to the distance between the vehicle and a further vehicle traveling ahead it is assessed whether the air supply mode is carried out.

Furthermore, it is possible to provide for the method to be carried out in such a way that the air supply system is controlled so that the air supply operation is carried out by operating a compressor which is coupled to a drive train, wherein the air supply system is also controlled so that the air supply operation is ended if the compressor is operated in an idling mode and/or is decoupled from the drive train.

In addition, the method according to the invention is configured in such a way that the air supply system is controlled so that, when overrun conditions of the vehicle are not occurring, the air supply operation is also carried out when the air supply of the vehicle is absolutely necessary.

Furthermore, the method according to the invention can be implemented in such a way that the current vehicle parameters include at least one parameter from the position data or altitude data of the vehicle, the vehicle speed, wheel speeds and/or yaw rates, a vehicle acceleration, a compressed air level of a brake system, a humidity level of a compressed air vessel or of a compressed air treatment cartridge, an engine speed, the absolute value and/or the sign of an engine torque, clutch data and/or gearspeed data, retarder data of the vehicle and distance from another vehicle traveling ahead.

Furthermore, it is advantageous to embody the method according to the invention in such a way that at least the altitude profile data and/or the current position data are obtained from a navigation system.

The inventive use of the navigation system is provided to permit an expected occurrence of at least one overrun condition of the vehicle to be determined as a function of the altitude profile data. In this case also, the properties and advantages which are explained in conjunction with the device according to the invention are obtained in the same way or a similar way, for which reason reference is also made to the corresponding statements relating to the device according to the invention in order to avoid repetition.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
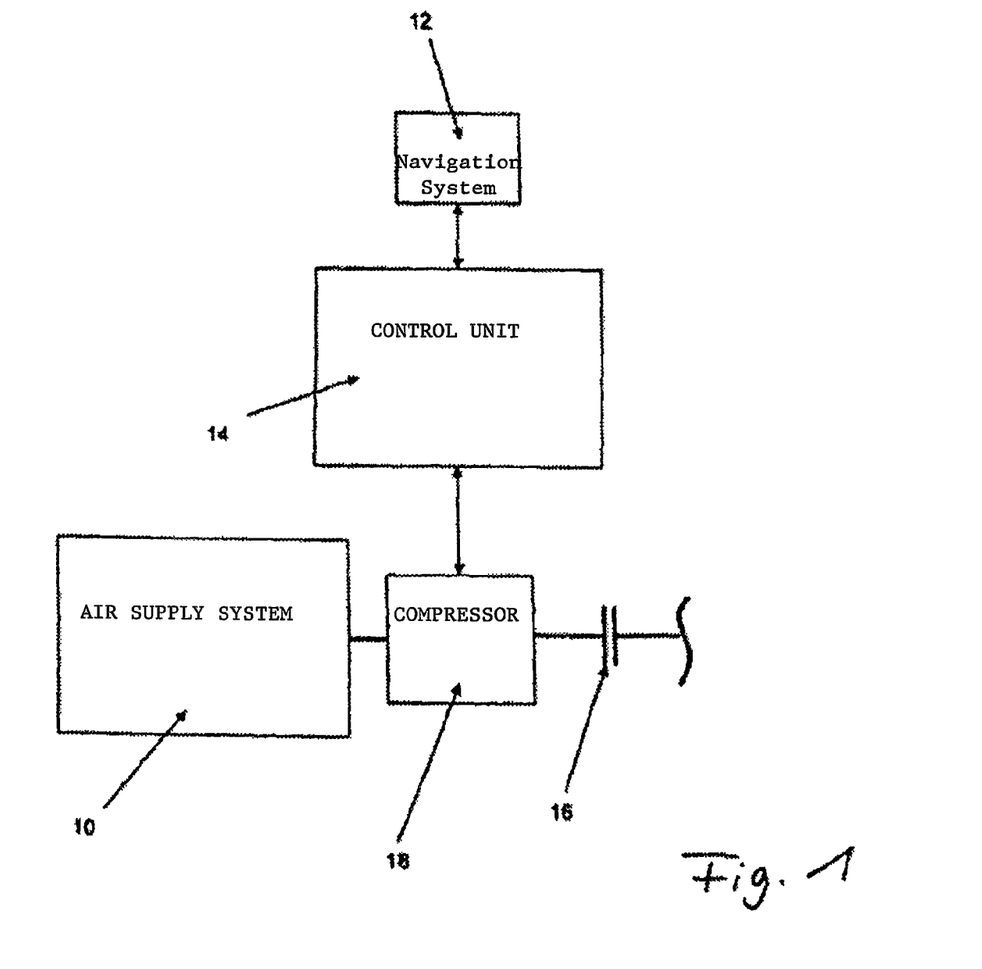
FIG. 1 is a schematic block diagram illustration of a device according to an embodiment of the invention for determining overrun conditions of a vehicle, which device is suitable for carrying out an exemplary method according to the invention.

FIG. 1 is a schematic illustration of a device for determining overrun conditions of a vehicle, which device is suitable for carrying out the method for determining overrun conditions. Before the method is explained with reference to FIGS. 2 and 3, more details will first be given on the design of the device for determining at least one overrun condition which is expected to occur in a vehicle. In this case, the device is described in conjunction with an air supply system 10 of a vehicle, in which context other vehicle components can also be used instead of or parallel to the air supply system 10 in conjunction with the device.

In the illustrated case, the device includes an air supply system 10 which is pneumatically coupled to a compressor 18 (which is not of greater interest here), in which case the compressor 18 can be operated in order to condition air. The compressor 18 is driven by a drive train 16 (illustrated only partially), and the transmission of torque to the compressor 18 here via the drive train 16 can be interrupted, for example, by a clutch. The drive train 16 preferably originates from an internal combustion engine (not shown here and not of greater interest) of the vehicle.

The drive train 16 can, in particular, be provided as a separate drive train for the compressor 18 or be branched off from a main drive train, coupled to a transmission, of the internal combustion engine. The compressor 18 is actuated in order to vary the air supply operation by a processing unit, a control unit 14, or a controller 14. The control unit 14 preferably likewise serves to interrupt the transmission of torque to the compressor 16 by actuating the clutch.

The control unit or processing unit ("control" and "processing" units being used interchangeably herein) 14 is in this case a unit which is known to a person skilled in the art and which can carry out calculation functions, processing functions, open-loop control functions and closed-loop control functions. The control unit 14 obtains data or information from a navigation system 12 via, inter alia, a connection which is suitable for exchanging data. The navigation system 12 is in this case a conventional navigation system 12, which is suitable for transmitting not only data which correlates with position information of the vehicle but also data which correlate with altitude (height) information, to the control unit 14. In particular, the navigation system 12 is suitable for supplying data which correlate with section-of-road altitude profiles to the control unit 14, from which data negative and positive gradients of the corresponding sections of road which the vehicle is traveling on or is to travel on can be calculated.

Figure 2:
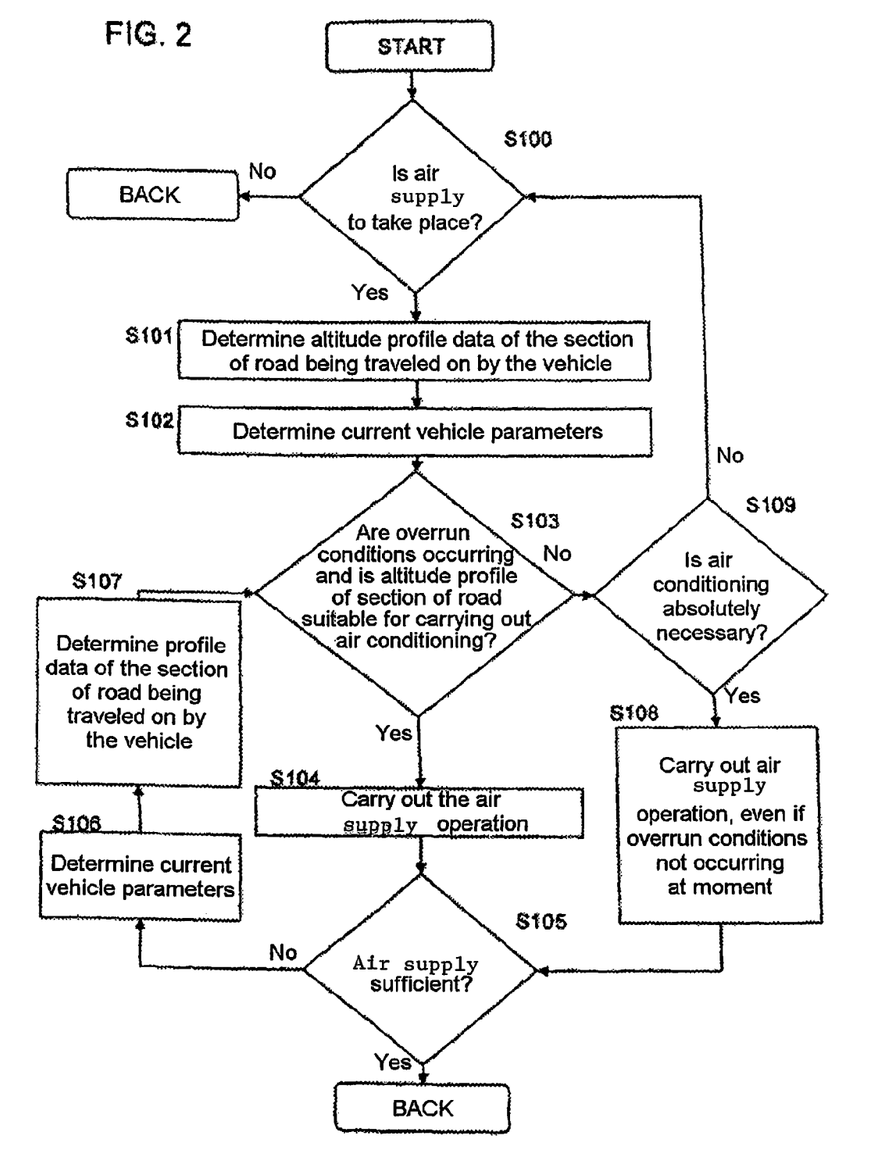
FIG. 2 is a flowchart of a method for determining overrun conditions which are expected to occur, in conjunction with an air supply system according to a first exemplary embodiment of the invention.

FIG. 2 is a flowchart of a method for determining overrun conditions which are expected to occur, in conjunction with the air supply system 10 in FIG. 1 according to a first exemplary embodiment of the invention. The following steps are carried out entirely by the processor or the control unit 14 in this exemplary embodiment. In this context it is to be noted that the control can also be carried out by different processing devices or control devices which communicate with one another and correspondingly exchange data.

At the start of the method, an interrogation as to whether air supply or feeding of compressed air is to be carried out by way of an air supply operation occurs in step S100. The interrogation of step S100 is linked, for example, to requirements about the compressed air conditions prevailing in individual compressed air circuits coupled to the air supply system 10. Inter alia, one requirement may be that the compressed air vessel which is assigned to a compressed air circuit is in a compressed air state. The compressed air circuits which are coupled to the air supply system may be, in particular, brake circuits, secondary consumer circuits, a trailer supply circuit, a parking brake circuit, an air suspension circuit, etc. If it is detected that no compressed air supply is to take place, and, for example, the compressed air level (pressure) of the corresponding compressed air circuits is sufficient, the method ends at this point and starts again from the beginning. If it is assessed that compressed air supply is to take place, and, for example, the compressed air level of at least one compressed air accumulator is below a predetermined limiting value, the method proceeds to step S101. At step S101, the control unit 14 obtains altitude profile data of a section of road which is being traveled on or is to be traveled on by the vehicle. Since in this exemplary embodiment a destination has not been predefined in the navigation system 12, the navigation system 12 transmits current altitude profile data, or altitude profile data which are calculated in advance up to a predetermined degree, of the section of road lying ahead of the vehicle. In this case, the altitude profile data of the section of road which is being traveled on by the vehicle include the section-of-road profile data from the current position of the vehicle up to a predetermined position. The section of road lying ahead of the vehicle is preferably predefined by the length of the road in which the vehicle is currently located. The predetermined position can be defined freely and can be predetermined in any desired way between the current position of the vehicle and the end of the road.

From the altitude profile data of the section of road being traveled on by the vehicle, the control unit 14 then calculates positive gradients and negative gradients at the current position of the vehicle and/or the profile of the section of road up to the predetermined position. Then, in step S102, current vehicle parameters are determined. The current vehicle parameters include, inter alia, at least one parameter from position data and altitude data of the vehicle obtained from the navigation system 12, inter-vehicle distance data which relate to a further vehicle traveling ahead of the vehicle and are obtained from a driver assistance system, a vehicle speed, in particular wheel speeds and/or yaw rates, a vehicle acceleration, the current compressed air level of the brake system, a humidity level of a compressed air cartridge of the brake system, an engine speed, an engine torque and the sign thereof, clutch data and/or gearspeed data of the vehicle, retarder data of the vehicle, etc.

After the current vehicle parameters have been determined in step S102, the method proceeds to step S103. In step S103, there is then, on the one hand, an interrogation to determine whether overrun conditions of the vehicle are present. The determination of the overrun conditions of the vehicle occurs at least partially as a function of one or more of the current vehicle parameters in this exemplary embodiment and can additionally also occur as a function of the altitude profile data of the section of road which is being traveled on. On the other hand, it is interrogated whether the determined altitude profile data of the section of road are suitable for carrying out an air supply operation. In particular, if a negative gradient is present on the section of road it is assessed that the air supply operation can be carried out. If the altitude profile data are calculated in advance from the current position up to the predetermined position, the assessment can also be carried out taking into account the section of road lying ahead of the vehicle, for example with reference to the length of the negative gradient. If the length of the negative gradient is large enough, the execution of the air supply operation is particularly favored. If it is defined in step S103 that overrun conditions of the vehicle are occurring and the altitude profile of the section of road is suitable for carrying out the air supply operation, the method proceeds to step S104 in which the air supply operation is carried out. In particular, in this case the compressor 18 is operated in order to feed compressed air or supply compressed air to the corresponding compressed air circuits. Then, in step S105 it is assessed whether the air supply of step S104 was sufficient. For example, this assessment is carried out with reference to checking the compressed air level of the air vessels of the corresponding compressed air circuits. If the air supply was sufficient, the method ends and starts again from the beginning. However, if it is assessed that the air supply was not sufficient, the current vehicle parameters and the altitude profile data of the section of road which is being traveled on are determined again in steps S106 and S107 in a way which is analogous to steps S101 and S102. This is due to the fact that in the meantime changes may have occurred to the corresponding data since the position of the vehicle may have changed in the meantime. Then, the abovementioned interrogation is carried out again in step S103. If it is decided in step S103 that no overrun conditions of the vehicle are occurring or the altitude profile of the section of road is unsuitable for carrying out the air supply operation, the method proceeds to step S109.

In step S109, a further interrogation as to whether the air supply is absolutely necessary takes place. This may be the case, for example, if at least one compressed air level of a compressed air vessel of a corresponding compressed air circuit has dropped below a critical level. If this is the case, the air supply operation is carried out even if at that particular moment overrun conditions of the vehicle are not occurring or owing to an unsuitable altitude profile of the section of road. Then, the interrogation of step S105 as explained above takes place again. However, if it is detected in step S109 that air supply is not absolutely necessary, and, for example, the compressed air level is above the critical level, the method returns to the step S100 which is described above.

Figure 3:
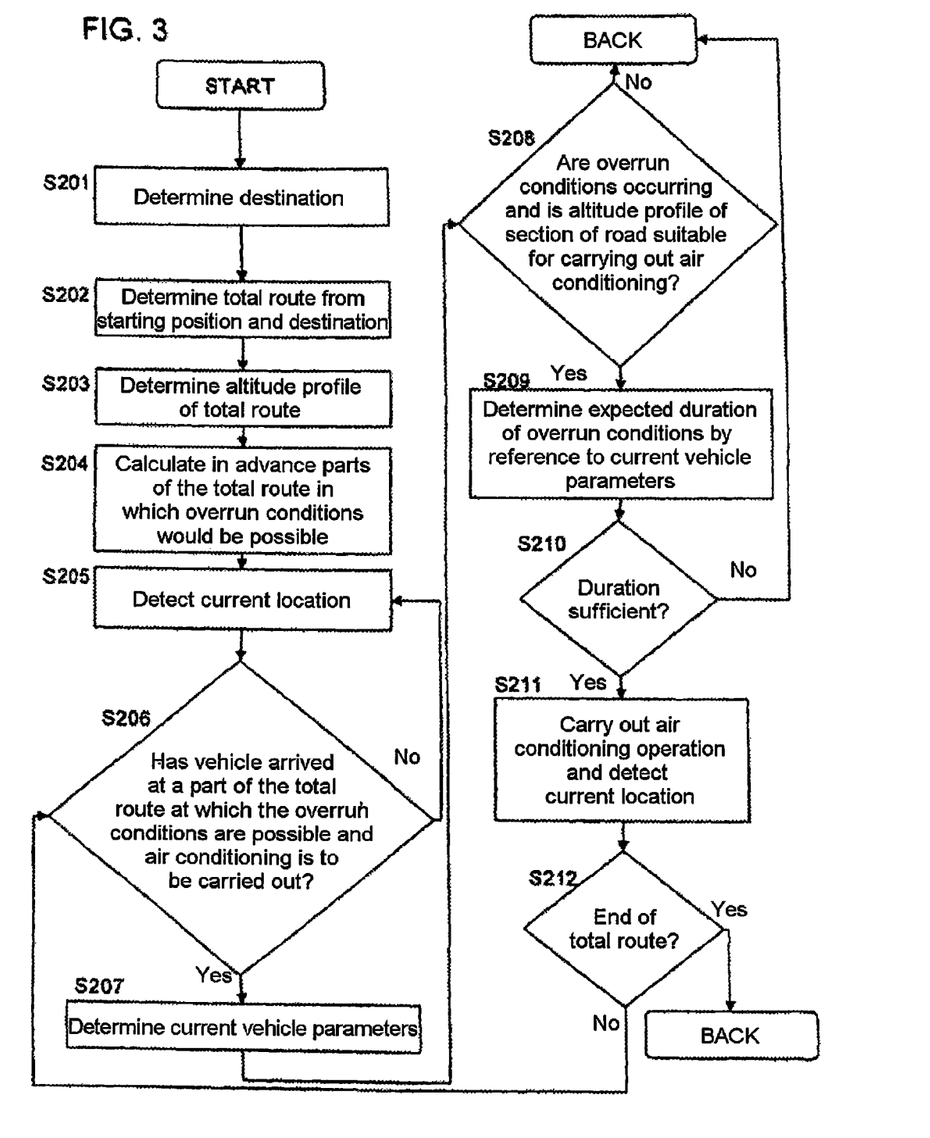
FIG. 3 is a flowchart of a method for determining overrun conditions which are expected to occur, in conjunction with the air supply system according to a second exemplary embodiment of the invention.

FIG. 3 is a flowchart of a method for determining overrun conditions which are expected to occur, in conjunction with the air supply system 10 in FIG. 1 according to a second exemplary embodiment of the invention. In this exemplary embodiment, the method starts at step S201 with the determination of a destination which has been input into the navigation system 12 and transmitted to the control unit 14. Furthermore, in step S202, the control unit 14 obtains, from the navigation system 12, the total route which is being traveled on by the vehicle and is to be covered, which results from the respective current starting position and the destination of the vehicle. Likewise, in step S203 the navigation system 12 transmits a total route altitude profile of the total route to be covered to the control unit 14. The control unit 14 then uses the total route altitude profile to calculate, in step S204, parts of the total route in which overrun conditions of the vehicle could occur and which would be suitable for carrying out an air supply operation.

In step S205, the current location of the vehicle is obtained. Then, in step S206 an interrogation takes place to determine whether the vehicle has arrived at a calculated part of the section of road at which overrun conditions would be possible, and whether air supply is to be carried out. In this context, the interrogation as to whether the air supply is carried out depends on the same criteria as in step S100 in FIG. 2. If the vehicle has not arrived at that part of the section of road which has been calculated in advance or if no air supply is to be carried out, the method returns to step S205 until both conditions, which are interrogated in step S206, are met.

It is noted that in this case an interrogation according to steps S109 and S108 has been dispensed with for the sake of simplicity. However, in each case an air supply operation is carried out if this is absolutely necessary, as described above in conjunction with steps S109 and S108.

If the conditions of the interrogation in step S206 are met, the method proceeds to step S207 in which the current vehicle parameters are determined in a way which is analogous to step S102 in FIG. 2. Then, step S208 is carried out, in which in the same way as in step S103 in FIG. 2, it is interrogated whether overrun conditions are occurring and it is preferably checked a further time whether the altitude profile of the section of road is suitable for carrying out the air supply operation. If this is not the case, the method ends and, if appropriate, starts again from the beginning. If it is detected in step S208 that the overrun conditions of the vehicle are occurring and the altitude profile of the section of road is correspondingly suitable, the method proceeds to step S209. In step S209, an expected duration of the overrun conditions is determined with reference to the current vehicle parameters. In particular, the duration of the overrun conditions is determined at least from the vehicle speed and the part of the section of road lying ahead of the vehicle. Next, the step S210 is carried out, in which it is interrogated whether the duration is sufficient for carrying out the air supply operation. In particular, the calculated expected duration is compared with a predetermined limiting value which specifies a minimum duration of the overrun conditions and can be defined as desired. If the expected duration is not sufficient, the method ends and if appropriate starts again from the beginning. If the duration is sufficient, in step S211 the air supply operation is carried out and the current location of the vehicle is subsequently determined. Alternatively or additionally, the distance from a vehicle traveling ahead can also be checked in step S210, and in a way which is analogous to the assessment of the expected duration of the overrun conditions it is possible to assess, by means of the inter-vehicle distance data, whether air supply is to be carried out. Then, in step S212, it is interrogated whether the end of the total route, that is to say the destination, has been reached. If this is not the case, the method returns to step S206 and remains in the interrogation loop 5206 and S205 until the next part of a section of road which is calculated in advance and in which overrun conditions would be possible is reached. If it is detected in step S212 that the end of the total route has been reached, the method ends and if appropriate starts again from the beginning.

| Table of Reference Numerals: | |
|---|---|
| 10 | Air supply system |
| 12 | Navigation system |
| 14 | Control unit/Processing unit/Controller |
| 16 | Drive train |
| 18 | Compressor |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle apparatus, comprising:
a control unit operatively configured to determine a probable occurrence of at least one overrun condition of the vehicle; and
a vehicle component having at least one operating mode;
wherein said control unit determines the probable occurrence of the at least one overrun condition of the vehicle as a function of altitude profile data associated with at least one of a road section being traveled on by the vehicle when the probable occurrence is determined and a road section to be traveled on by the vehicle at a future time;
wherein the control unit is operatively configured to control the operating mode of the vehicle component as a function of the at least one overrun condition of the vehicle determined to probably occur;
wherein said vehicle component is one of a brake system, a brake system component, a dynamo, a generator, an air supply system, a compressor, a retarder, an air suspension control module, a tachometer, and an engine controller;
wherein the control unit is operatively configured to control the air supply system of the vehicle, the air supply system synchronously carrying out an air supply operation when the probable overrun condition is determined; and
wherein the control unit is operatively configured to assess whether the air supply operation is being carried out based on inter-vehicle distance data relating to a distance between the vehicle and a vehicle traveling ahead.

2. A vehicle apparatus, comprising:
a control unit operatively configured to determine a probable occurrence of at least one overrun condition of the vehicle; and
a vehicle component having at least one operating mode;
wherein said control unit determines the probable occurrence of the at least one overrun condition of the vehicle as a function of altitude profile data associated with at least one of a road section being traveled on by the vehicle when the probable occurrence is determined and a road section to be traveled on by the vehicle at a future time;
wherein the control unit is operatively configured to control the operating mode of the vehicle component as a function of the at least one overrun condition of the vehicle determined to probably occur;
wherein said vehicle component is one of a brake system, a brake system component, a dynamo, a generator, an air supply system, a compressor, a retarder, an air suspension control module, a tachometer, and an engine controller;
wherein the control unit is operatively configured to control the air supply system of the vehicle, the air supply system synchronously carrying out an air supply operation when the probable overrun condition is determined;
wherein the control unit is operatively configured to control the air supply system such that the air supply operation is carried out by operating a compressor coupled to a drive train of the vehicle; and
wherein the control unit is operatively configured to control the air supply system such that the air supply operation ends if the compressor is operated in at least one of an idling mode and a mode decoupled from the drive train.

3. A vehicle apparatus, comprising:
a control unit operatively configured to determine a probable occurrence of at least one overrun condition of the vehicle; and
a vehicle component having at least one operating mode;
wherein said control unit determines the probable occurrence of the at least one overrun condition of the vehicle as a function of altitude profile data associated with at least one of a road section being traveled on by the vehicle when the probable occurrence is determined and a road section to be traveled on by the vehicle at a future time;
wherein the control unit is operatively configured to control the operating mode of the vehicle component as a function of the at least one overrun condition of the vehicle determined to probably occur;
wherein said vehicle component is one of a brake system, a brake system component, a dynamo, a generator, an air supply system, a compressor, a retarder, an air suspension control module, a tachometer, and an engine controller;
wherein the control unit is operatively configured to control the air supply system of the vehicle, the air supply system synchronously carrying out an air supply operation when the probable overrun condition is determined; and
wherein the control unit is operatively configured to control the air supply system to carry out air supply operations when the overrun condition is not occurring if the air supply of the vehicle is required.

4. A method of operating a vehicle, the method comprising the acts of:
receiving altitude profile data of a road section being traveled on by the vehicle and/or a road section to be traveled on by the vehicle at a future time;
determining a probable occurrence of at least one overrun condition of the vehicle as a function of the received altitude profile data;
utilizing the probable occurrence of the at least one overrun condition in controlling an operation of the vehicle, the utilizing act comprising the act of controlling an air supply system of the vehicle to carry out an air supply operation synchronously when the overrun condition that will probably occur does occur; and
assessing whether or not the air supply operation is to be carried out based on an inter-vehicle distance relating to a distance between the vehicle and a vehicle traveling ahead.

5. A method of operating a vehicle, the method comprising the acts of:
receiving altitude profile data of a road section being traveled on by the vehicle and/or a road section to be traveled on by the vehicle at a future time;
determining a probable occurrence of at least one overrun condition of the vehicle as a function of the received altitude profile data; and
utilizing the probable occurrence of the at least one overrun condition in controlling an operation of the vehicle, the utilizing act comprising the act of controlling an air supply system of the vehicle to carry out an air supply operation synchronously when the overrun condition that will probably occur does occur;
wherein the air supply system is carried out by operating a compressor coupled to a drive train of the vehicle, the air supply system being further controlled to end the air supply if the compressor is operated in at least one of an idling mode and a mode decoupled from the drive train.

6. A method of operating a vehicle, the method comprising the acts of:
receiving altitude profile data of a road section being traveled on by the vehicle and/or a road section to be traveled on by the vehicle at a future time;
determining a probable occurrence of at least one overrun condition of the vehicle as a function of the received altitude profile data; and
utilizing the probable occurrence of the at least one overrun condition in controlling an operation of the vehicle, the utilizing act comprising controlling an air supply system of the vehicle such that, when the overrun condition is not occurring, the air supply operation is still carried out when air supply to the vehicle is critical.

* * * * *